(12) United States Patent
Craddock et al.

(10) Patent No.: US 10,210,131 B2
(45) Date of Patent: Feb. 19, 2019

(54) SYNCHRONOUS DATA INPUT/OUTPUT SYSTEM USING PREFETCHED DEVICE TABLE ENTRY

(71) Applicant: INTERNATIONAL BUSINESS MACHINES CORPORATION, Armonk, NY (US)

(72) Inventors: David F. Craddock, New Paltz, NY (US); Matthias Klein, Wappingers Falls, NY (US); Eric N. Lais, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 219 days.

(21) Appl. No.: 15/209,111

(22) Filed: Jul. 13, 2016

(65) Prior Publication Data

US 2018/0018297 A1    Jan. 18, 2018

(51) Int. Cl.
*G06F 12/00*     (2006.01)
*G06F 13/42*     (2006.01)
*G06F 13/28*     (2006.01)
*G06F 13/40*     (2006.01)
*G06F 12/0862*   (2016.01)

(52) U.S. Cl.
CPC ...... *G06F 13/4291* (2013.01); *G06F 12/0862* (2013.01); *G06F 13/28* (2013.01); *G06F 13/4022* (2013.01); *G06F 2212/602* (2013.01)

(58) Field of Classification Search
CPC .................. G06F 12/0862; G06F 2212/602
See application file for complete search history.

(56) References Cited

U.S. PATENT DOCUMENTS

| | | | |
|---|---|---|---|
| 2007/0168643 A1 | 7/2007 | Hummel et al. | |
| 2008/0209130 A1 | 8/2008 | Kegel et al. | |
| 2011/0320759 A1* | 12/2011 | Craddock | G06F 12/1081 711/206 |
| 2013/0132622 A1 | 5/2013 | Ajanovic et al. | |
| 2015/0149731 A1 | 5/2015 | Auernhammer et al. | |
| 2016/0127494 A1* | 5/2016 | Liu | H04L 67/2842 709/212 |

* cited by examiner

*Primary Examiner* — Zachary K Huson
(74) *Attorney, Agent, or Firm* — Cantor Colburn LLP; Steven Chiu

(57) ABSTRACT

Embodiments include methods, systems, and computer program products for performing synchronous data I/O. Aspects include a processor of computer system sending a store block to request data from a device through a PCIe connection, requested data having a predetermined number of data blocks, and the processor executing a data transaction loop to retrieve requested data. Executing the data transaction loop may include writing to a table prefetch trigger register on host bridge to queue up speculative prefetches in ETU for each data block. The host bridge may perform a first speculative prefetch to install a device table entry in a device table cache. The processor may further perform a second speculative prefetch to install an address translation in an address translation cache. The host bridge processes the data block received through direct memory access over the PCIe connection using the prefetched device table entry and address translation.

20 Claims, 3 Drawing Sheets

SYNCHRONOUS DATA INPUT/OUTPUT SYSTEM USING PREFETCHED DEVICE TABLE ENTRY

BACKGROUND

The present disclosure relates generally to computer systems, and more particularly to methods, systems, and computer program products of synchronous data input/output (I/O) system using prefetched device table entry.

For a computer system having multiple data storage devices, accessing data on these data storage devices takes time and resources. Conventionally, the computer system uses an asynchronous data I/O system. In the asynchronous data I/O system, when a processor of the computer system requests certain data from one of the storage devices, the storage device takes a certain amount of time to get the data back to the processor. Typically, the processor yields its processor power to other processes, programs, tasks, and/or threads while the processor waits for the data. Such an asynchronous data I/O system is inefficient. In order to increase the efficiency of data I/O, a synchronous data I/O system may be used. The synchronous data I/O system retrieves data from the storage devices faster in comparison since the processor does wait for the data, and in turn may not share processing power with the other processes, programs, tasks, and/or threads.

Typically, the synchronous data I/O system fetches a dedicated device table entry (DTE) for each transaction. For example, the dedicated DTE is fetched from memory at the start of the transaction. Typically, the processor uses direct memory access (DMA) to access the DTE, which causes the processor to wait until a response arrives before making progress. Such delays associated with the DMA apply to each transaction. In addition, in order to guarantee peripheral component interconnect Express (PCIe) ordering rules, a host bridge stalls all incoming data traffic until the fetching of the DTE is completed and the fetching response arrives. Thus, depending on the latency within the memory subsystem, the latency for the affected transactions increases, for example by 100 ns-500 ns. In turn, the latencies of subsequent transactions increase similarly leading to a gap in the data flow, and limiting bandwidth. Thus, it is desirable to eliminate the gap in the data flow to improve efficiency of the synchronous I/O and consequently the computer system.

Therefore, heretofore unaddressed needs still exist in the art to address the aforementioned deficiencies and inadequacies.

SUMMARY

In one aspect, the present disclosure relates to a method of performing synchronous data I/O using prefetched device table entry. In certain embodiments, the method may include sending, by a processor of a computer system, a store block to request data from a device of a data storage subsystem through a peripheral component interconnect Express (PCIe) connection. The requested data may have a predetermined number of data blocks. The method further includes executing, by the processor, a data transaction loop to retrieve requested data. The transaction loop includes one data transaction for each data block until the requested data is received from the device. In certain embodiments, executing the data transaction loop may include writing, by the processor, to a table prefetch trigger register on a host bridge to queue up a speculative table prefetch in an express transfer unit (ETU) for each of the data blocks. Executing the data transaction loop may further include performing, by the host bridge, a first speculative prefetch to install a device table entry in a device table (DT) cache prior to arrival of the data block, the first speculative prefetch being returned from a main memory of the computer system. Executing the data transaction loop may further include performing, by the host bridge, a second speculative prefetch to install an address translation in an address translation (AT) cache prior to arrival of the data block, the second speculative prefetch being requested by the host bridge based on the first speculative prefetch and the returned device table entry. Executing the data transaction loop may further include processing, by the host bridge, the data block when the data block is received through direct memory access (DMA) over the PCIe connection using the device table entry in the DT cache and the address translation in the AT cache, respectively.

In another aspect, the present disclosure relates to a computer system having a synchronous data I/O system. In certain embodiments, the computer system having the synchronous data I/O system may include a data storage subsystem having one or more devices configured to store data; one or more peripheral component interconnect Express (PCIe) switches configured to connect the predetermined number of devices with the computer system using one or more PCIe connections, and the computer system. In certain embodiments, the computer system may include at least a processor, a host bridge, a PCIe switch, and a non-transitory storage medium storing an operating system, and computer executable instructions. When the computer executable instructions are executed by the processor, the computer executable instructions cause the processor to perform a method of synchronous data I/O using prefetched device table entry. In certain embodiments, the method may include sending, by a processor of a computer system, a store block to request data from a device of a data storage subsystem through a peripheral component interconnect Express (PCIe) connection. The requested data may have a predetermined number of data blocks. The method further includes executing, by the processor, a data transaction loop to retrieve requested data. The transaction loop includes one data transaction for each data block until the requested data is received from the device. In certain embodiments, executing the data transaction loop may include writing, by the processor, to a table prefetch trigger register on a host bridge to queue up a speculative table prefetch in an express transfer unit (ETU) for each of the data blocks. Executing the data transaction loop may further include performing, by the host bridge, a first speculative prefetch to install a device table entry in a device table (DT) cache prior to arrival of the data block, the first speculative prefetch being returned from a main memory of the computer system. Executing the data transaction loop may further include performing, by the host bridge, a second speculative prefetch to install an address translation in an address translation (AT) cache prior to arrival of the data block, the second speculative prefetch being requested by the host bridge based on the first speculative prefetch and the returned device table entry. Executing the data transaction loop may further include processing, by the host bridge, the data block when the data block is received through direct memory access (DMA) over the PCIe connection using the device table entry in the DT cache and the address translation in the AT cache, respectively.

In yet another aspect, the present disclosure relates to a computer program product operable on a computer system having a synchronous data I/O system. In certain embodiments, the computer system having a synchronous data I/O system may include a processor and a non-transitory computer storage medium configured to store an operating system, and computer executable instructions for execution by the processor of the computer system for performing a method of synchronous data I/O using prefetched device table entry. The method may include sending, by a processor of a computer system, a store block to request data from a device of a data storage subsystem through a peripheral component interconnect Express (PCIe) connection. The requested data may have a predetermined number of data blocks. The method further includes executing, by the processor, a data transaction loop to retrieve requested data. The transaction loop includes one data transaction for each data block until the requested data is received from the device. In certain embodiments, executing the data transaction loop may include writing, by the processor, to a table prefetch trigger register on a host bridge to queue up a speculative table prefetch in an express transfer unit (ETU) for each of the data blocks. Executing the data transaction loop may further include performing, by the host bridge, a first speculative prefetch to install a device table entry in a device table (DT) cache prior to arrival of the data block, the first speculative prefetch being returned from a main memory of the computer system. Executing the data transaction loop may further include performing, by the host bridge, a second speculative prefetch to install an address translation in an address translation (AT) cache prior to arrival of the data block, the second speculative prefetch being requested by the host bridge based on the first speculative prefetch and the returned device table entry. Executing the data transaction loop may further include processing, by the host bridge, the data block when the data block is received through direct memory access (DMA) over the PCIe connection using the device table entry in the DT cache and the address translation in the AT cache, respectively.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The subject matter, which is regarded as the present disclosure, is particularly pointed out and distinctly claimed in the claims at the conclusion of the specification. The foregoing and other features and advantages of the present disclosure are apparent from the following detailed description taken in conjunction with the accompanying drawings in which:

DETAILED DESCRIPTION

Figure 1:
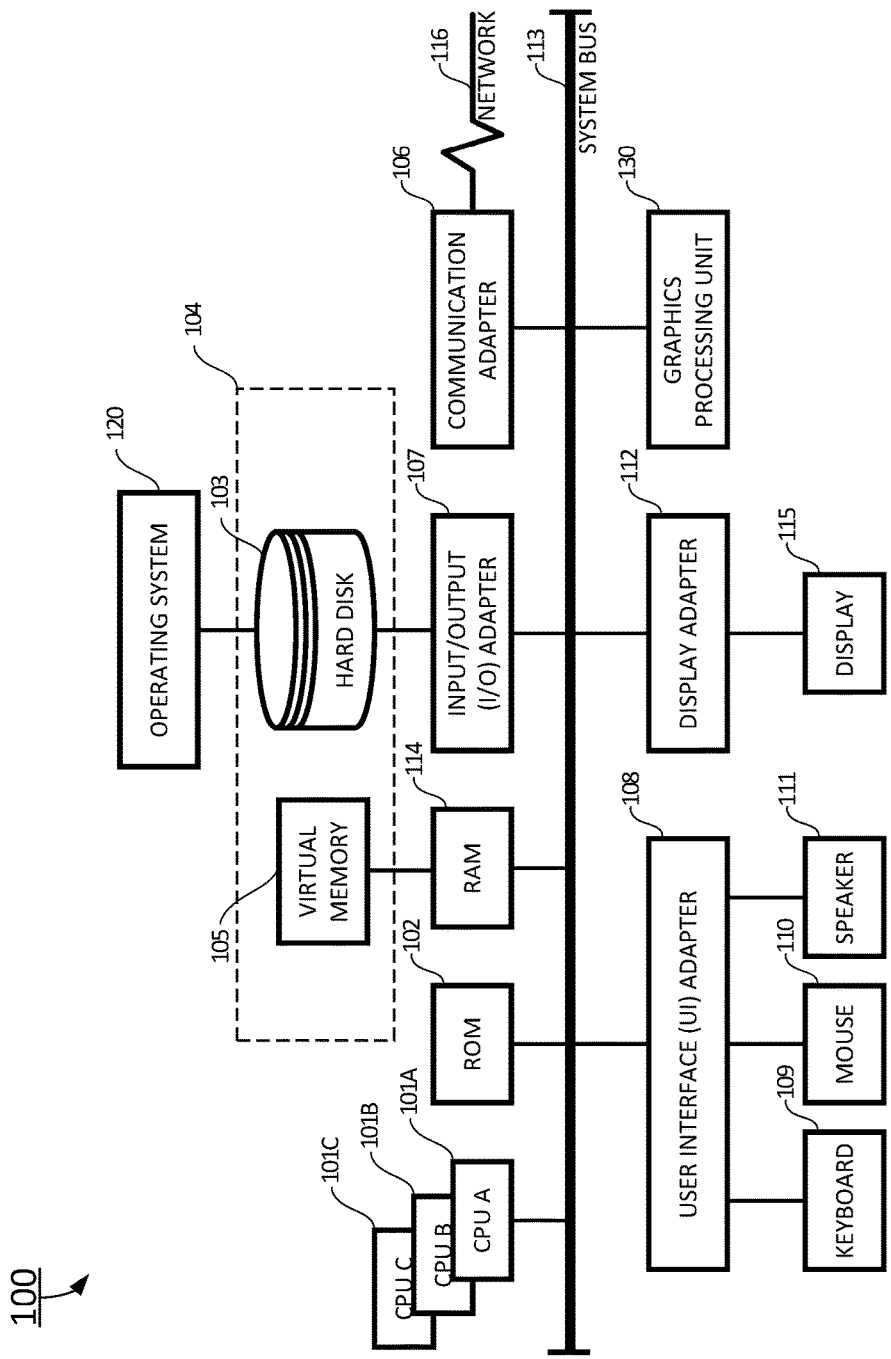
FIG. 1 is a block diagram illustrating an exemplary computer system of performing synchronous data I/O using prefetched device table entry according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "plurality" means two or more. The terms "comprising," "including," "carrying," "having," "containing," "involving," and the like are to be understood to be open-ended, i.e., to mean including but not limited to.

A device table entry (DTE) contains a limit and base register for PCIe addresses where the data is allowed. The DTE further contains address translation (AT) details, such as references to an AT table that resides in a memory of the computer system. The DTE further includes control information about how packets from a device are to be processed. In order to provide data protection, when data is stored in a storage device, the data cannot be directly accessed or modified by processor. The data must be copied/transferred/DMAed to a local memory and the processor can only access/modify the data in the local memory. The DTE provides information about address translation of the data between the PCIe address specified by the storage device and the address in local memory. The DTE prefetch facilitates a processor to instruct hardware components to prefetch a DTE, which in turn facilitates the hardware components to access the DTE with lower latency.

A device table (DT) provides content information of a number of devices. The DT is usually stored in memory and cached in a DT cache in the host bridge of the device where data is stored or retrieved.

The AT table is stored in memory and cached in an AT cache in the host bridge for the device where data is stored or retrieved.

As used herein, a DT is a table that resides in the processor memory, and DTE is an entry in the DT. The DTE contains data that the processor uses to process the data coming from the I/O device. Firmware running on the processor sets up the DT for information about the devices that are attached to the host bridge. When a host bridge gets a packet or a data block from a device, the host bridge accesses the DT and obtains the DTE and information about the device that facilitates the host bridge to process the packet or the data block coming from the device.

For example, the DTE contains the type of address translation used by the device. For example, when the processor gets a packet from an PCIe address, the address of the packet or the data block is not the address used to store in main memory. The processor protects the main memory from badly behaving PCIe devices, by using a limit and base register in the DTE. The device corresponding to the DTE uses the limit and base register for translating the PCIe address. For example, the host bridge or the processor performs address translation (AT), to determine where the AT resides in the memory, and the address that to the device via DMA.

The term computer program, as used above, may include software, firmware, and/or microcode, and may refer to programs, routines, functions, classes, and/or objects. The term shared, as used above, means that some or all code from multiple modules may be executed using a single (shared) processor.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings FIGS. 1-3, in which certain exemplary embodiments of the present disclosure are shown. The present disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Referring to FIG. 1, there is shown an embodiment of a computer system 100 of performing synchronous data I/O using prefetched device table entry and implementing the teachings herein. In this embodiment, the computer system 100 has one or more central processing units (CPU, or processors) 101A, 101B, 101C, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of the computer system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the computer system 100 may be stored in mass storage 104. A network adapter 106 interconnects bus 113 with an outside network 116 enabling the computer system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the computer system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 1, the computer system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1. In certain embodiments, the network 116 may include symmetric multiprocessing (SMP) bus, a Peripheral Component Interconnect (PCI) bus, local area network (LAN), wide area network (WAN), telecommunication network, wireless communication network, and the Internet.

For a synchronous data I/O system, each transaction requires a dedicated device table entry to be fetched from memory at the start of the transaction. The DTE may be fetched using a direct memory access (DMA), which causes the fetching of DTE to wait. For example, the processor may be idle until the DMA response arrives before fetching the DTE Additional memory accesses that may be part of the transaction leading to additional delays. In addition, in order to guarantee PCIe ordering rules, a host bridge stalls all incoming data traffic until the fetching of the DTE is completed and the fetching response arrives. The same process applies to the address translation information that is used for processing packets from a device, if enabled for address translation. Since the DTE contains the address translation information, the address translation is processed after the DTE has been processed. Thus, depending on the latency within the memory subsystem, the latency for the transactions increases by typically 100 ns-500 ns. Further, the latencies for subsequent transactions similarly increase leading to a gap in the data flow, and limiting bandwidth. The technical solutions described herein eliminate the gap in the data flow.

Figure 2:
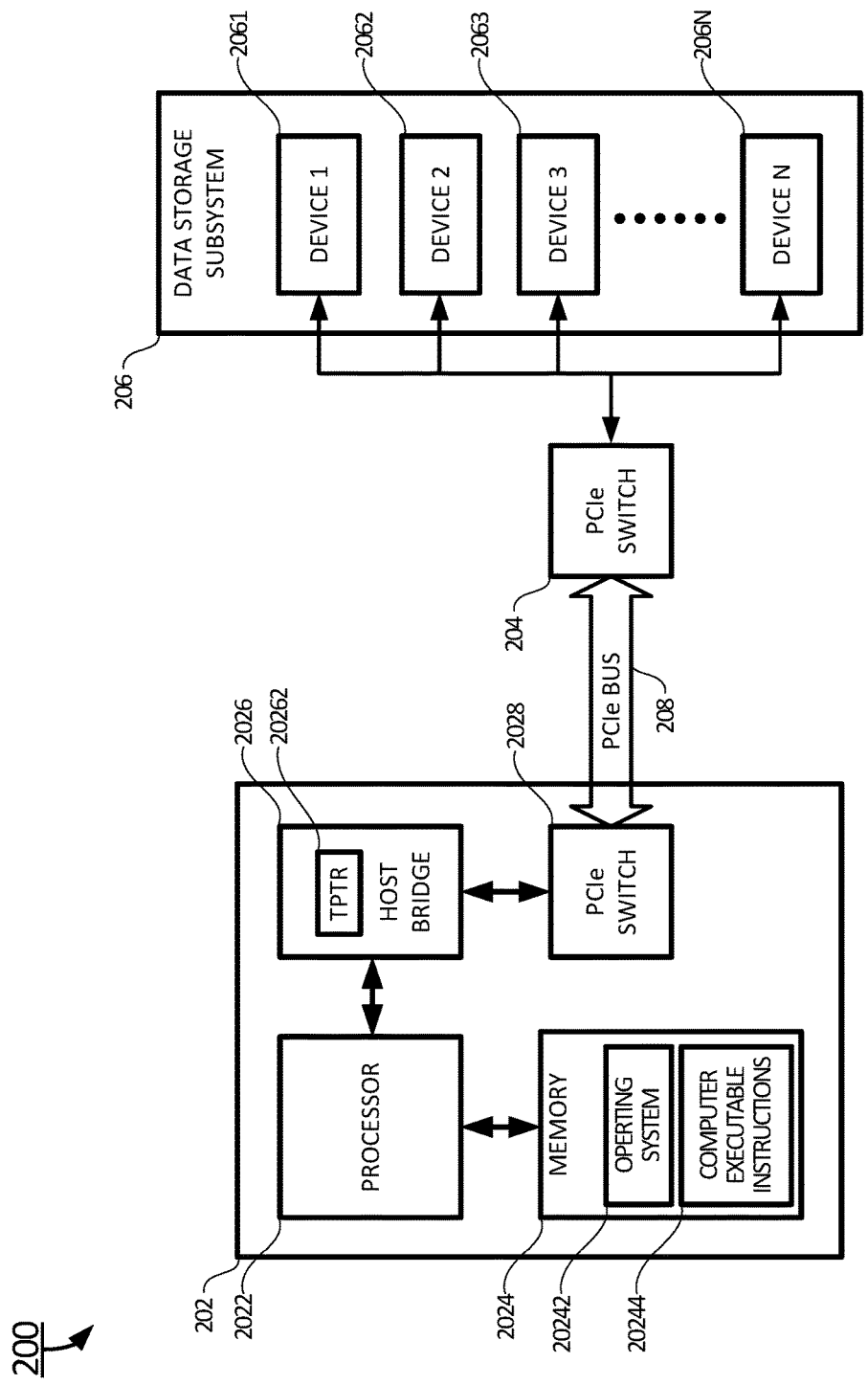
FIG. 2 is a block diagram of computer system having a synchronous data I/O system for performing synchronous data I/O using prefetched device table entry according to certain embodiments of the present disclosure.

In one aspect, the present disclosure relates to a computer system having a synchronous data I/O system 200 as shown in FIG. 2. In certain embodiments, the computer system having the synchronous data I/O system 200 may include: a data storage subsystem 206 configured to store data, one or more PCIe switches 204 configured to connect the data storage subsystem 206 with a computer system 202 using one or more PCIe connections, and the computer system 202.

In certain embodiments, the computer system 202 may include at least a processor 2022, a non-transitory storage medium (memory) 2024, a host bridge 2026, and a PCIe switch 2028. The host bridge 2026 may connect the processor 2022 to the data storage subsystem 206 of the computer system 202 through the PCIe switch 2028 and a PCIe bus 208.

In certain embodiments, the host bridge 2026 is the main communication channel between the processor 2022 and any PCIe attached devices for data storage and/or network communication. The host bridge 2026 is a hardware component in the path of data transmission between the processor 2022 and the data storage subsystem 206. The processor 2022 sends a command to the data storage subsystem 206 for requesting data via the host bridge 2026. In response, the data requested is sent to the host bridge 2026 and then to the computer system 202. The host bridge 2026 sends packets, data, and/or data blocks (hereinafter referred to as packets) to the processor 2022. The host bridge 2026 may process the packets, for example to perform cyclic redundancy check (CRC) checking, address translations, protective services on behalf of the computer system 202. The host bridge 2026 subsequently stores the packets at the corresponding location.

In certain embodiments, the DT is stored in the memory 2024 of the processor 2022. In certain embodiments, parts of the DT are stored in a DT cache in the host bridge 2026. Address translation (AT) information is stored in the memory 2024 of the processor 2022, and in certain embodiments in an AT cache in the host bridge 2026. The data storage subsystem 206 may include a predetermined number of devices. For example, as shown in FIG. 2, the data storage subsystem 206 may include N different devices, such as Device 1 (2061), Device 2 (2062), Device 3 (2063), . . . , and Device N (206N), where N is a positive integer. In certain embodiments, the host bridge 2026 may connect up to 32,000 PCIe attached devices. In certain embodiments, the PCIe attached devices may include one or more Fibre Connection (FICON) devices, one or more Ethernet devices, one or more optics devices, one or more cryptographical devices, one or more synchronous I/O devices, one or more flash storage devices, one or more solid-state devices, or any other storage device, and/or any combinations of the listed devices.

Typically, for each individual device, a device table entry (DTE) stores information including where the data is from, and how the data should be processed. The host bridge 2026 may not have a memory capacity that holds up to 32000 DTEs. The computer system 202 or the host bridge 2026 may include a DT cache and an AT cache to store the DTE and AT information for the device. In response to a packet received from a device if a corresponding DTE is not in the cache, the host bridge accesses the main memory where the device table is located and retrieve the DTE corresponding to the device. When the DTE is retrieved from the main memory, and installed and attached in the DT cache, the host bridge 2026 has the information to process the received packet. Thus, a latency (or delay) is added. In addition to the retrieving the corresponding DTE, the host bridge also performs an address translation based on the entries in the address translation cache, in case the device is enabled for address translation in the DTE. Since the DTE includes the AT entries, the address translation is performed after the DTE has been received, adding to the latency.

Typically, when the processor 2022 waits for the requested data, the processor 2022 stays idle. Alternatively, in high-efficiency computer system 202 that uses an asynchronous data I/O, other processes, programs, tasks and/or threads use the processor 2022 to do other meaningful work. Later, in response to the requested data being received by the host bridge 2026 or the processor 2022, the processor 2022 may switch the control to the process for processing the received data.

In certain embodiments, the computer system 202 as shown in FIG. 2 may perform data I/O synchronously and the latency, if any, may be too short to let the processor 2022 to yield its control to other processes, programs, tasks, and/or threads to do other meaningful work. In embodiments with synchronous data I/O, each data transaction fetches a corresponding DTE. For example, consider that the processor 2022 requests 1 Giga Bytes (GB) data. The data transaction is divided into smaller data blocks. In one embodiment, each data block may include 4 Kilo Bytes (KB) of data resulting in 250,000 data transactions for the 1 GB data. Accordingly, the processor 2022 may have to fetch 250,000 DTEs in order to process the 1 GB data. Without a corresponding DTE for each data transaction, the processor 2022 has to wait for fetching the corresponding DTE. Even when the processor 2022 gets the requested data block from the device, if the corresponding DTE is not in the DT cache, the processor 2022 stalls all traffic until the corresponding DTE from the device table in the memory is installed in the DT cache. The processor 2022 further waits for the address translation information to be installed in the AT cache on the host bridge. Thus, the processor 2022 may be in a state where the data from the device has been received, and waiting for the DTE and address translations. It is understood that the above scenario is just one example, and that several other example scenarios with different data block sizes and data requests are possible.

In certain embodiments, the memory 2024 may store an operating system 20242, and computer executable instructions 20244. When the computer executable instructions 20244 are executed at the processor 2022, the computer executable instructions 20244 cause the processor 2022 to perform a method of synchronous data I/O using prefetched device table entry. In certain embodiments, the method may include sending a store block to request data from a device of the data storage subsystem 206 through a PCIe connection. For example, the processor 2022 of the computer system 202 may send the request. The data requested may include one or more data blocks. The method may further include starting a data transaction loop to retrieve the data requested. The data transaction loop may include one data transaction for each data block until the requested data is received from the device.

In certain embodiments, the data transaction loop may include writing to a table prefetch trigger register 20262 on a host bridge 2026 to queue up a speculative table prefetch in an express transfer unit (ETU) for each of the data blocks. For example, the processor 2022 may write to the table prefetch trigger register 20262. The host bridge 2026 may perform a first speculative prefetch to install a DTE in the DT cache prior to arrival of the data block. The first speculative prefetch may be returned from the main memory 2024 of the computer system 202. The host bridge 2026 may further perform a second speculative prefetch to install an address translation (AT) in an AT cache prior to arrival of the data block. The second speculative prefetch may be requested by the host bridge 2026 based on the first speculative prefetch and the returned device table entry (DTE). The host bridge 2026 may process the data block when the data block is received through DMA over the PCIe connection. The host bridge 2026 processes the data block using the DTE in the DT cache and the address translation in the AT cache, respectively. Thus, there is no wait for the DTE and address translation because the DTE is pre-installed in the DT cache and the address translation is already installed in the address translation cache, prior to the arrival of the data block from the device. Therefore, the technical solutions described herein eliminate the waiting gaps for each data block in the data flow by prefetching the DTE into the DT cache.

In certain embodiments, upon initializing each synchronous data I/O transaction, firmware not only notifies the synchronous data I/O endpoint (the device) but also triggers a DTE prefetch for the synchronous data I/O transaction. Two options to trigger the DTE prefetch for the synchronous data I/O transaction may include: (a) a dedicated command into the host bridge (for example an XCMD tap) to trigger the prefetch by writing to a table prefetch trigger register 20262; and (b) an implicit trigger based on analysis of the data blocks flowing through the host bridge 2026. For example, PCI store operations may be snooped to detect a set up for a synchronous data I/O transaction to/from the device. The host bridge 2026 accordingly identifies that a synchronous I/O command has been issued. In addition to the information used by the synchronous data I/O endpoint, the data of the command contains the bus and the function number. The host bridge 2026 snoops the command by analyzing a predetermined section of the PCI store block data and triggers a prefetch of the corresponding DTE.

Each synchronous data I/O transaction starts with a PCI store block to the synchronous data I/O device. The synchronous data I/O having prefetched DTE may reduce latency for the each of the synchronous data I/O transactions, and avoid certain penalty imposed by the synchronous data I/O initial delay and PCIe orderings. The synchronous data I/O having prefetched DTE may increase bandwidth for the entire PCIe connection by avoiding the pipeline stall during the synchronous data I/O transaction initial DTE fetches.

In certain embodiments, the table prefetch trigger register 20262 may include a bus number of the device, function number, address translation information, and a target address to be translated.

In certain embodiments, the PCIe connection may include: the host bridge 2026, at least one PCIe bus 208, at least two PCIe switches, one on the host bridge 2026 side of the PCIe bus 208 connecting to the host bridge 2026, and one on the device side of the PCIe bus 208 connecting to the device of the data storage subsystem 206.

In certain embodiments, the requested data may include multiple data blocks, and each data block may be a fixed sized data block having predetermined bytes of data. In one embodiment, the data block may be 4 KB. In another embodiment, the data block may be 1 KB. Each data block may be transmitted through a data transaction and each data transaction may include a corresponding device table entry to be prefetched prior to the completion of the data transaction.

In another aspect, the present disclosure relates to a method of performing synchronous data I/O using prefetched device table entry. In certain embodiments, the method may include: a processor 2022 of a computer system 202 sending a store block to request data from a device of a data storage subsystem through a PCIe connection, the requested data having a predetermined number of data blocks, and the processor 2022 of the computer system 202 starting a data transaction loop to retrieve requested data, one data transaction for each data block until the requested data is received from the device.

In certain embodiments, the table prefetch trigger register may include a bus number of the device, a function number, and address translation information. In certain embodiments, the DTE may include a limit and base register for PCIe addresses where the data is allowed, address translation (AT) information, such as where the AT resides in the memory, and an address range that is allowed to do direct memory access (DMA).

Figure 3:
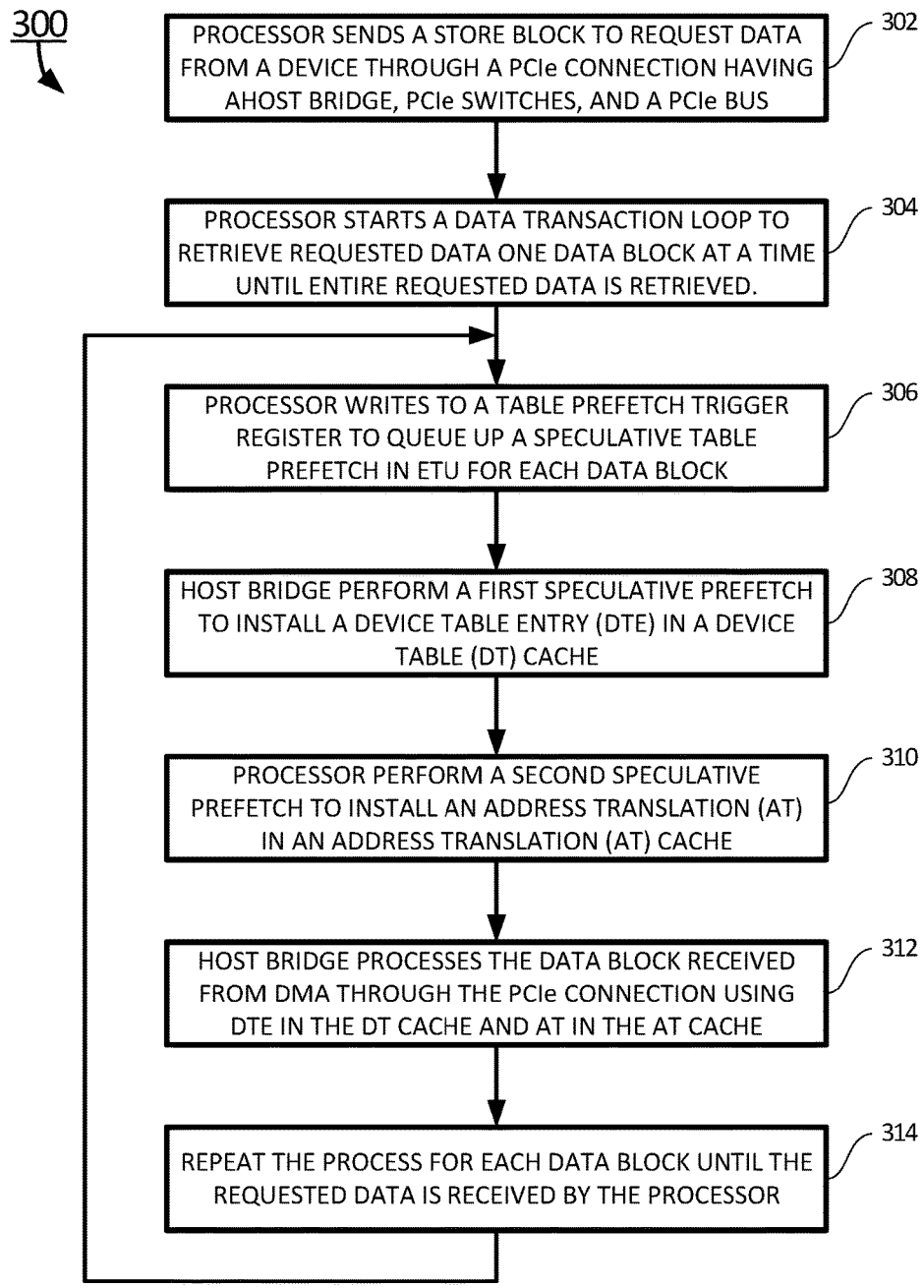
FIG. 3 is a flow chart of an exemplary method of performing synchronous data I/O using prefetched device table entry according to certain embodiments of the present disclosure.

Referring now to FIG. 3, a flow chart of an exemplary method 300 of performing synchronous data I/O using prefetched device table entry is shown according to certain embodiments of the present disclosure.

At block 302, the processor 2022 of the computer system 202 may send a store block to request data from a device of a data storage subsystem 206 through a PCIe connection. The PCIe connection may include a host bridge 2026, at least one PCIe switch 2028 on the host bridge 2026, at least one PCIe bus 208, at least one PCIe switch 204 on the device end of the PCIe bus 208.

At block 304, the processor 2022 of the computer system 202 may start a data transaction loop to retrieve the requested data. The requested data may include a predetermined number of fixed sized data blocks. The data transaction loop may retrieve one data block at a time until entire requested data is retrieved from the device.

At block 306, the processor 2022 may write a table prefetch trigger register (TPTR) 20262 on the host bridge 2026 to queue up a speculative table prefetch in an Express Transfer Unit (ETU).

At block 308, the host bridge 2026 may perform a first speculative prefetch to install a device table entry (DTE) in a device table (DT) cache. The first speculative prefetch is returned from a main memory of the computer system.

At block 310, depending on address translation specification of the DTE, another speculative prefetch might be issued by the host bridge 2026 to prefetch the required address translation information based on the first speculative prefetch and the device table entry returned. The host bridge 2026 may perform a second speculative prefetch to install an address translation (AT) in an address translation (AT) cache.

At block 312, the host bridge 2026 may process the data block received through direct memory access (DMA) over the PCIe connection using the DTE in the DT cache and the address translation in the address translation cache, respectively. There is no wait for the device table entry and address translation because the DTE is already installed in the DT cache and the address translation is already installed in the address translation cache, prior to the arrival of the data block from the device. Accordingly, the technical solutions described herein eliminate the waiting gaps for each data block in the data flow by prefetching the DTE.

At block 314, the processor 2022 may repeat the process between block 306 and block 312 for each data block until the entire requested data is retrieved from the device by the processor 2022.

In yet another aspect, the present disclosure relates to a computer program product operable on a computer system having a synchronous data I/O system. In certain embodiments, the computer system having a synchronous data I/O system may include a processor and a non-transitory computer storage medium configured to store an operating system, and computer executable instructions for execution by the processor of the computer system for performing a method of synchronous data I/O using prefetched device table entry as described herein.

The present disclosure may be a computer system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for performing synchronous data input/output (I/O) using prefetched device table entry, the method comprising:
    sending, by a processor of a computer system, a store block to request data from a device of a data storage subsystem through a peripheral component interconnect Express (PCIe) connection, wherein the data requested comprises a plurality of data blocks; and
    executing, by the processor, a data transaction loop to retrieve data requested, one data transaction for each of the plurality of data blocks until the data requested is received from the device, wherein executing the data transaction loop comprises:
        writing, by the processor, to a table prefetch trigger register on a host bridge to queue up a speculative table prefetch in an express transfer unit (ETU) for each of the plurality of data blocks;
        performing, by the host bridge, a first speculative prefetch to install a device table entry in a device table (DT) cache prior to arrival of the data block, wherein the first speculative prefetch is returned from a main memory of the computer system; and
        performing, by the host bridge, a second speculative prefetch to install an address translation in an address translation (AT) cache prior to arrival of the data block, wherein the second speculative prefetch is requested by the host bridge based on the first speculative prefetch and the returned device table entry; and
    processing, by the host bridge, the data block when the data block is received through direct memory access (DMA) over the PCIe connection in response to having executed the data transaction loop to performed the first and second speculative prefetches for installing the device table entry in the device table cache and for installing the address translation in the address translation cache, respectively.

2. The method of claim 1, wherein the PCIe connection comprises:
    the host bridge;
    a PCIe bus; and
    a pair of PCIe switches, one PCIe switch on each end of the PCIe bus.

3. The method of claim 1, wherein a device from the data storage subsystem is at least one storage device from a group of storage devices consisting of:
    a Fibre Connection (FICON) device;
    an Ethernet device;
    an optics device;
    a cryptographical device;
    a synchronous I/O device;
    a flash storage device; and
    a solid-state-device.

4. The method of claim 1, wherein the table prefetch trigger register comprises:
    a bus number of the device;
    function number; and
    address translation information.

5. The method of claim 1, wherein the device table entry comprises:
    a limit and base register for PCIe addresses where the data is allowed;
    memory location of an address translation (AT) table; and
    an address for direct memory access (DMA).

6. The method of claim 1, wherein each data block comprises a predetermined bytes of data.

7. The method of claim 6, wherein each data transaction comprises a corresponding device table entry to be prefetched prior to completion of the data transaction.

8. A computer system having a synchronous data input/output system, comprising:
    a data storage subsystem having one or more devices configured to store data;
    one or more peripheral component interconnect Express (PCIe) switches configured to connect the one or more devices with the computer system using one or more PCIe connections; and
    the computer system having at least a processor, a host bridge, a PCIe switch, and a non-transitory storage medium storing an operating system, and computer executable instructions, when executed at the processor, the computer executable instructions cause the processor to perform a method of synchronous data input/output using prefetched device table entry, the method comprising:
    sending a store block to request data from a device of the one or more devices through a PCIe connection, wherein the data requested comprises a plurality of data blocks; and
    executing a data transaction loop to retrieve data requested, one data transaction for each of the plurality of data blocks until the data requested is received from the device, wherein executing the data transaction loop comprises:
        writing to a table prefetch trigger register on a host bridge to queue up a speculative table prefetch in an express transfer unit (ETU) for each of the plurality of data blocks;
        performing, by the host bridge, a first speculative prefetch to install a device table entry in a device table (DT) cache prior to arrival of the data block, wherein the first speculative prefetch is returned from a main memory of the computer system; and
        performing, by the host bridge, a second speculative prefetch to install an address translation in an address translation (AT) cache prior to arrival of the data block, wherein the second speculative prefetch is requested by the host bridge based on the first speculative prefetch and the returned device table entry; and
    processing, by the host bridge, the data block when the data block is received through direct memory access (DMA) over the PCIe connection in response to having executed the data transaction loop to performed the first and second speculative prefetches for installing the device table entry in the device table cache and for installing the address translation in the address translation cache, respectively.

9. The synchronous data input/output system of claim 8, wherein the PCIe connection comprises:

the host bridge;
a PCIe bus; and
two PCIe switches, one on each end of the PCIe bus.

10. The synchronous data input/output system of claim 8, wherein a device from the data storage subsystem is one from a group of storage devices consisting of:
   a Fibre Connection (FICON) device;
   an Ethernet device;
   an optics device;
   a cryptographical device;
   a synchronous I/O device;
   a flash storage device; and
   a solid-state-device.

11. The synchronous data input/output system of claim 8, wherein the table prefetch trigger register comprises:
   a bus number of the device;
   function number; and
   address translation information.

12. The synchronous data input/output system of claim 8, wherein the device table entry comprises:
   a limit and base register for PCIe addresses where the data is allowed;
   memory location of an address translation (AT) table; and
   an address for direct memory access (DMA).

13. The synchronous data input/output system of claim 8, wherein each data block comprises a predetermined bytes of data.

14. The synchronous data input/output system of claim 13, wherein each data transaction comprises a corresponding device table entry to be prefetched prior to completion of the data transaction.

15. A computer program product operable on a computer system having a synchronous data input/output system, comprising a processor and a non-transitory computer storage medium configured to store an operating system, and computer executable instructions for execution by the processor of the computer system for performing a method for synchronous data input/output using prefetched device table entry, the method comprising:
   sending, by the processor of the computer system, a store block to request data from a data storage subsystem through a peripheral component interconnect Express (PCIe) connection, wherein the data requested comprises a plurality of data blocks, and each data block comprises a predetermined bytes of data; and
   executing, by the processor, a data transaction loop to retrieve the data requested, one data transaction for each of the plurality of data blocks until the data requested is received from the device, wherein executing the data transaction loop comprises:
   writing, by the processor, to a table prefetch trigger register on a host bridge to queue up a speculative table prefetch in an express transfer unit (ETU) for each of the plurality of data blocks;
   performing, by the host bridge, a first speculative prefetch to install a device table entry in a device table (DT) cache prior to arrival of the data block, wherein the first speculative prefetch is returned from a main memory of the computer system;
   performing, by the host bridge, a second speculative prefetch to install an address translation in an address translation (AT) cache prior to arrival of the data block, wherein the second speculative prefetch is requested by the host bridge based on the first speculative prefetch and the returned device table entry; and
   processing, by the host bridge, the data block when the data block is received through direct memory access (DMA) over the PCIe connection in response to having executed the data transaction loop to performed the first and second speculative prefetches for installing the device table entry in the device table cache and for installing the address translation in the address translation cache, respectively.

16. The computer program product of claim 15, wherein the PCIe connection comprises:
   the host bridge;
   a PCIe bus; and
   two PCIe switches, one on each end of the PCIe bus.

17. The computer program product of claim 15, wherein a device from the data storage subsystem is at least one storage device from a group of storage devices consisting of:
   a Fibre Connection (FICON) device;
   an Ethernet device;
   an optics device;
   a cryptographical device;
   a synchronous I/O device;
   a flash storage device; and
   a solid-state-device.

18. The computer program product of claim 15, wherein the table prefetch trigger register comprises:
   a bus number of the device;
   function number; and
   address translation information.

19. The computer program product of claim 15, wherein the device table entry comprises:
   a limit and base register for PCIe addresses where the data is allowed;
   a memory location of an address translation (AT) table; and
   an address for direct memory access (DMA).

20. The computer program product of claim 15, wherein each data transaction comprises a corresponding device table entry to be prefetched prior to completion of the data transaction.

* * * * *